United States Patent
Wiatrowski et al.

(10) Patent No.: US 10,575,321 B1
(45) Date of Patent: Feb. 25, 2020

(54) METHOD OF OPERATING A USER EQUIPMENT TO CONNECT TO A RADIO ACCESS NETWORK

(71) Applicant: MOTOROLA SOLUTIONS, INC., Chicago, IL (US)

(72) Inventors: David G Wiatrowski, Woodstock, IL (US); Kok Seng Ang, Bukit Mertajam (MY); Dipendra M Chowdhary, Hoffman Estates, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 40 days.

(21) Appl. No.: 16/123,094

(22) Filed: Sep. 6, 2018

(51) Int. Cl.
*H04W 72/12* (2009.01)
*H04W 16/10* (2009.01)
*H04W 16/14* (2009.01)

(52) U.S. Cl.
CPC ....... *H04W 72/1242* (2013.01); *H04W 16/10* (2013.01); *H04W 16/14* (2013.01); *H04W 72/121* (2013.01); *H04W 72/1268* (2013.01)

(58) Field of Classification Search
CPC .................................................. H04W 72/12
See application file for complete search history.

(56) References Cited

U.S. PATENT DOCUMENTS

| 9,775,050 | B1 | 9/2017 | Wang et al. | |
| 2014/0364075 | A1* | 12/2014 | Sullivan | H03J 7/18 455/166.1 |
| 2016/0212624 | A1 | 7/2016 | Mueck et al. | |
| 2016/0381558 | A1 | 12/2016 | Caulfield | |
| 2017/0188241 | A1 | 6/2017 | Mueck et al. | |
| 2017/0201934 | A1* | 7/2017 | Kim | H04W 48/16 |

(Continued)

FOREIGN PATENT DOCUMENTS

| EP | 1052824 A1 | 11/2000 |
| EP | 3264831 A1 | 1/2018 |

OTHER PUBLICATIONS

The International Search Report and the Written Opinion corresponding patent application No. PCT/US2019/047382 filed Aug. 21, 2019, dated Nov. 7, 2019, all pages.

(Continued)

*Primary Examiner* — Sulaiman Nooristany
(74) *Attorney, Agent, or Firm* — Raguraman Kumaresan

(57) ABSTRACT

A process for connecting a user equipment to a radio access network in which communication frequencies are dynamically allocated from a shared radio spectrum. In operation, the user equipment maintains a radio frequency scan list that indicates a prioritized order with which a plurality of radio frequencies selected from the shared radio spectrum are to be scanned. The user equipment scans the radio frequencies in accordance with the prioritized order that is indicated in the radio frequency scan list and selects a target radio frequency from the radio frequencies based on the scanning of the radio frequencies. The target radio frequency corresponds to a frequency band that is dynamically allocated from the shared radio spectrum to a radio access network associated with the user equipment. The user equipment then connects to the radio access network using the frequency band corresponding to the target radio frequency.

16 Claims, 8 Drawing Sheets

(56) References Cited

U.S. PATENT DOCUMENTS

2018/0035301 A1    2/2018  Nama et al.

OTHER PUBLICATIONS

Wireless Innovation Forum, "Signaling Protocols and Procedures for Citizens Broadband Radio Service (CBRS): Spectrum Access System (SAS)—Citizens Broadband Radio Service Device (CBSD) Interface Technical Specification", Document WINNF-16-S-0016, Version V1.0.1, Dec. 22, 2016, all pages.

* cited by examiner

| CHANNEL BW (MHz) | MAXIMUM CBRS CHANNELS | POSSIBLE FREQUENCY REUSE FACTORS | PRACTICAL FREQUENCY REUSE FACTORS |
|---|---|---|---|
| 5 | 30 | 1, 3, 4, 7, 9, 12, 13, 16, 19, 21, 25, 27, 28 | 1, 3, 4, 7, 9, 12 |
| 10 | 15 | 1, 3, 4, 7, 9, 12, 13 | 1, 3, 4 |
| 15 | 10 | 1, 3, 4, 7, 9 | 1, 3 |
| 20 | 7 | 1, 3, 4, 7 | 1, 3 |

| 5 MHz CHANNEL BW | REUSE SET 1 | REUSE SET 2 | REUSE SET 3 | REUSE SET 4 | REUSE SET 5 | REUSE SET 6 | REUSE SET 7 | REUSE SET 8 | REUSE SET 9 | REUSE SET 10 |
|---|---|---|---|---|---|---|---|---|---|---|
| N = 3 | 3552.5<br>3602.5<br>3652.5 | 3557.5<br>3607.5<br>3657.5 | 3562.5<br>3612.5<br>3662.5 | 3567.5<br>3617.5<br>3667.5 | 3572.5<br>3622.5<br>3672.5 | 3577.5<br>3627.5<br>3677.5 | 3582.5<br>3632.5<br>3682.5 | 3587.5<br>3637.5<br>3687.5 | 3592.5<br>3642.5<br>3692.5 | 3597.5<br>3647.5<br>3697.5 |
| N = 4 | 3552.5<br>3587.5<br>3622.5<br>3657.5 | 3557.5<br>3592.5<br>3627.5<br>3662.5 | 3562.5<br>3597.5<br>3632.5<br>3667.5 | 3567.5<br>3602.5<br>3637.5<br>3672.5 | 3572.5<br>3607.5<br>3642.5<br>3677.5 | 3577.5<br>3612.5<br>3647.5<br>3682.5 | 3582.5<br>3617.5<br>3652.5<br>3687.5 | N/A | N/A | N/A |
| N = 7 | 3552.5<br>3572.5<br>3592.5<br>3612.5<br>3632.5<br>3652.5<br>3672.5 | 3557.5<br>3577.5<br>3597.5<br>3617.5<br>3637.5<br>3657.5<br>3677.5 | 3562.5<br>3582.5<br>3602.5<br>3622.5<br>3642.5<br>3662.5<br>3682.5 | 3567.5<br>3587.5<br>3607.5<br>3627.5<br>3647.5<br>3667.5<br>3687.5 | N/A | N/A | N/A | N/A | N/A | N/A |
| N = 9 | 3552.5<br>3567.5<br>3582.5<br>3597.5<br>3612.5<br>3627.5<br>3642.5<br>3657.5<br>3672.5 | 3557.5<br>3572.5<br>3587.5<br>3602.5<br>3617.5<br>3632.5<br>3647.5<br>3662.5<br>3677.5 | 3562.5<br>3577.5<br>3592.5<br>3607.5<br>3622.5<br>3637.5<br>3652.5<br>3662.5<br>3682.5 | N/A | N/A | N/A | N/A | N/A | N/A | N/A |
| N = 12 | 3552.5<br>3562.5<br>3572.5<br>3582.5<br>3592.5<br>3602.5<br>3612.5<br>3622.5<br>3632.5<br>3642.5<br>3652.5<br>3662.5 | 3557.5<br>3567.5<br>3577.5<br>3587.5<br>3597.5<br>3607.5<br>3617.5<br>3627.5<br>3637.5<br>3647.5<br>3657.5<br>3667.5 | N/A | N/A | N/A | N/A | N/A | N/A | N/A | N/A |

420

| 10 MHz CHANNEL BW | REUSE SET 11 | REUSE SET 12 | REUSE SET 13 | REUSE SET 14 | REUSE SET 15 |
|---|---|---|---|---|---|
| N = 3 | 3555.0<br>3605.0<br>3655.0 | 3565.0<br>3615.0<br>3665.0 | 3575.0<br>3625.0<br>3675.0 | 3585.0<br>3635.0<br>3685.0 | 3595.0<br>3645.0<br>3695.0 |
| N = 4 | 3555.0<br>3585.0<br>3615.0<br>3645.0 | 3565.0<br>3595.0<br>3625.0<br>3655.0 | 3575.0<br>3605.0<br>3635.0<br>3665.0 | N/A | N/A |

| 15 MHz CHANNEL BW | REUSE SET 16 | REUSE SET 17 | REUSE SET 18 |
|---|---|---|---|
| N = 3 | 3557.5<br>3602.5<br>3647.5 | 3572.5<br>3617.5<br>3662.5 | 3587.5<br>3632.5<br>3677.5 |

| 20 MHz CHANNEL BW | REUSE SET 19 | REUSE SET 20 |
|---|---|---|
| N = 3 | 3560.0<br>3600.0<br>3640.0 | 3580.0<br>3620.0<br>3660.0 |

METHOD OF OPERATING A USER EQUIPMENT TO CONNECT TO A RADIO ACCESS NETWORK

BACKGROUND OF THE INVENTION

Wireless communication devices such as portable two-way radios communicate voice, data, video, and other traffic through one or more wireless communication networks. However, a wireless communication device needs to connect to a desired network before it can begin communicating via the network. In order to connect to the network, the wireless communication device observes beacon signals broadcasted by the networks in a given geographical area and further establishes a link connection to the desired network in accordance with the connection procedure defined by a mobile operator controlling the network.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

FIG. 3 is a table showing examples of frequency reuse factors that are mapped corresponding to different channel bandwidths in the shared radio spectrum in accordance with some embodiments.

FIG. 4A is a table illustrating example frequency reuse channel sets that are available for frequency reuse factors of three (3), four (4), seven (7), nine (9), and twelve (12) for a channel bandwidth of 5 MHz in accordance with some embodiments.

FIG. 4B is a table illustrating example frequency reuse channel sets that are available for frequency reuse factors of three (3) and four (4) for a channel bandwidth of 10 MHz in accordance with some embodiments.

FIG. 4C is a table illustrating example frequency reuse channel sets that are available for frequency reuse factor of three (3) for a channel bandwidth of 15 MHz in accordance with some embodiments.

FIG. 4D is a table illustrating example frequency reuse channel sets that are available for frequency reuse factor of three (3) for a given channel bandwidth of 10 MHz in accordance with some embodiments.

Figure 1:
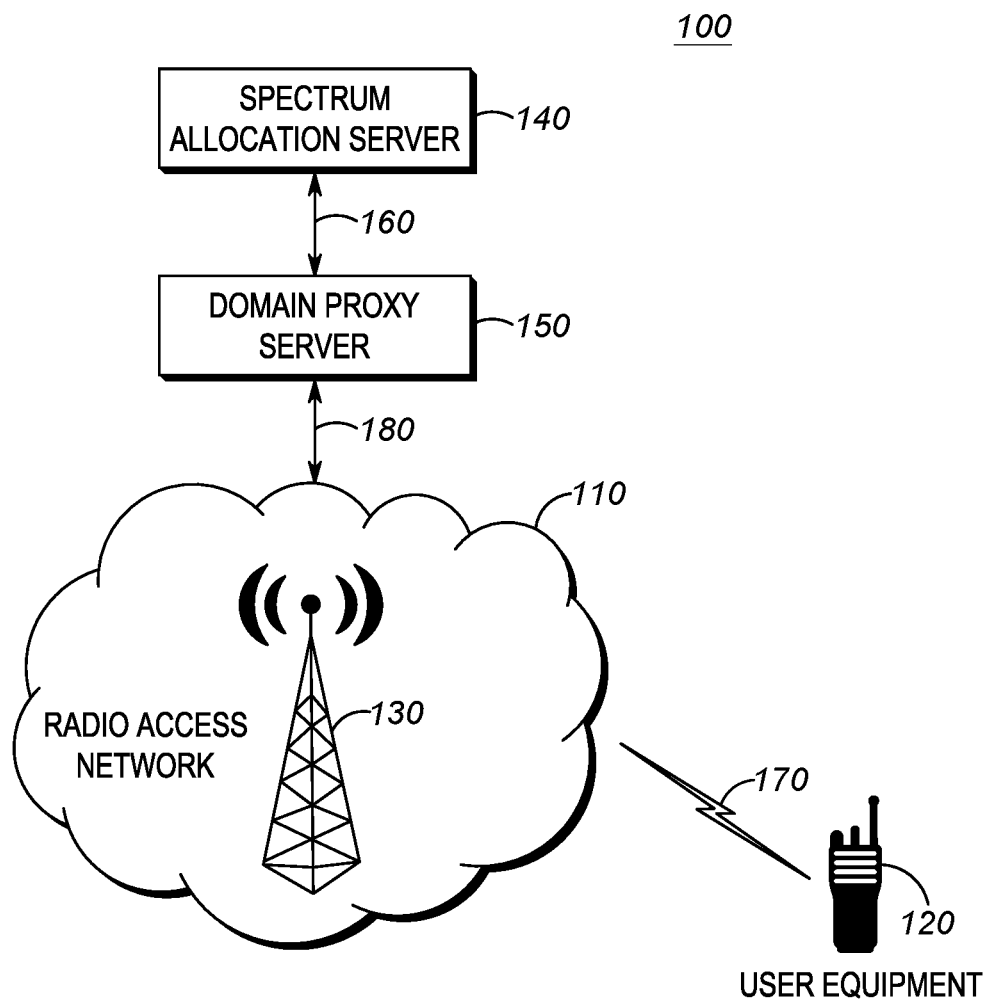
FIG. 1 is a block diagram of a communication system in which communication frequencies are dynamically allocated to a radio access network from a shared radio spectrum, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Wireless communication devices such as user equipments (UEs) that are implemented in accordance with radio access technologies (e.g., Long Term Evolution (LTE)) can be adapted to take advantages of shared radio spectrum services. Shared radio spectrum services refer to services in which communication resources are dynamically allocated on a shared basis to radio access networks from a radio spectrum that is otherwise allocated for primary usage by incumbent devices.

One example of shared radio spectrum service is Citizen Broadband Radio Service (CBRS) that is established by Federal Communications Commission (FCC) in United States. CBRS allows an operator of the shared radio spectrum service to provide broadband communication services to a user equipment via frequency channels that are dynamically allocated from the CBRS band (also referred to as LTE band 48). CBRS band is a 150 MHz band, covering frequencies from 3550 MHz to 3700 MHz in the 'S' band of the electromagnetic spectrum. The 150 MHz band was previously a protected spectrum used by incumbent users such as US navy, and now FCC has authorized the use of the 150 MHz band for shared wireless access.

The CBRS is governed by a three-tiered spectrum authorization framework which includes rules to govern the allocation of frequencies to non-incumbent devices and to further protect incumbent users from harmful interference from non-incumbent users. The framework further provides for priority access to non-incumbent users who may be assigned priority access licenses (PAL) within the 3550-3650 MHz portion of the CBRS band. Other non-incumbent users are referred to as general authorized access (GAA) users and are permitted to use any portion of the 3550-3700 MHz band that is not assigned and/or otherwise unused by the PAL users.

In CBRS, spectrum (both channel center frequency and bandwidth) is dynamically allocated (taking into consideration frequencies allocable to incumbent devices) to Citizens Broadband Service Devices (CBSDs) (e.g., LTE eNodeBs) and further coordinated by a commercially-provided spectrum access system (SAS). In systems such as CBRS which provides shared radio spectrum services, it is not known by subscribers (e.g., LTE UEs), a priori, which portion of the shared radio spectrum will be in use by its particular CBRS network when it powers on or when the user switches to a CBRS mode of operation. The UE must therefore scan the entire spectrum in an attempt to locate its network. This full scan of shared radio spectrum (i.e., LTE band 48) can take over a minute and this may be an unacceptably large amount of time to power up and to attach to a wireless network.

Disclosed is an improved process of connecting a user equipment to a radio access network in which communication frequencies are dynamically allocated from the shared radio spectrum, such as CBRS band. The disclosed process improves the initial network acquisition/connection process for a user equipment by reducing the amount of time (i.e., access time) it takes for the user equipment to connect to a radio access network by enabling the user equipment to scan the shared radio spectrum in accordance with a radio frequency scan list which indicates a prioritized order with which the frequencies within the shared radio spectrum are to be scanned. The prioritized order of frequencies is determined based on anticipated channel bandwidth as well as the frequency reuse factor used by the customer network.

One embodiment provides a method of operating a user equipment to connect to a radio access network in which communication frequencies are dynamically allocated from a shared radio spectrum. The method includes: maintaining, by the user equipment, a radio frequency scan list that indicates a prioritized order with which a plurality of radio frequencies selected from the shared radio spectrum are to be scanned; scanning, by the user equipment, the plurality of radio frequencies in accordance with the prioritized order that is indicated in the radio frequency scan list; selecting, by the user equipment, a target radio frequency from the plurality of radio frequencies based on the scanning of the plurality of radio frequencies, the target radio frequency corresponding to a frequency band that is dynamically allocated from the shared radio spectrum to a radio access network associated with the user equipment; and connecting, by the user equipment, to the radio access network using the frequency band corresponding to the target radio frequency.

Another embodiment provides a user equipment including a memory, a wireless transceiver; and an electronic processor communicatively coupled to the memory and wireless transceiver. The memory maintains a radio frequency scan list that indicates a prioritized order with which a plurality of radio frequencies selected from a shared radio spectrum are to be scanned. The electronic processor is configured to: scan, via the wireless transceiver, the plurality of radio frequencies in accordance with the prioritized order that is indicated in the radio frequency scan list, select a target radio frequency from the plurality of radio frequencies based on the scan of the plurality of radio frequencies, the target radio frequency corresponding to a frequency band that is dynamically allocated from the shared radio spectrum to a radio access network associated with the user equipment, and connect, via the wireless transceiver, to the radio access network using the frequency band corresponding to the target radio frequency.

Referring now to the drawings, and in particular FIG. 1, a communication system 100 is shown including a radio access network 110 that provides for radio communication links to be arranged within the network 110 for providing shared radio spectrum services to a user equipment 120. The user equipment 120 may be portable, mobile, or stationary, and may include for example, a radio, a smart phone, a mobile device, a converged device (for example, a long term evolution (LTE) and land mobile radio (LMR) converged device), a tablet, a personal digital assistant (PDA), or other communication device that includes or can be connected to a network modem or components to enable wireless network communications (such as a baseband processor, memory, amplifier, antenna, and the like). Although FIG. 1 shows a single radio access network 110 and a single user equipment 120, the communication system 100 may include any number of radio access networks each serving any number of user equipments 120. The radio access network 110 includes a system infrastructure that includes a network of various terminals, which are in direct radio communication with the user equipment 120. The terminals operating in the radio access network 110 may be fixed or mobile terminal and may have one or more base stations 130 which may, for example, serve user equipments 120 in a given region or area, known as "cell" or "site", by radio frequency (RF) communication. The base station 130 may also be referred to as citizen broadband service device (CBSD), eNodeB, repeater, or access point depending on the type of radio access technologies that are used to implement the radio access network 110. In accordance with some embodiments, each base station 130 within the communication system 100 may be operated using a different channel and/or bandwidth. The radio access network 110 may operate according to an industry standard wireless access technology such as, for example, an LTE, an LTE-advance, or 5G technology.

The base station 130 is configured to broadcast (for example, periodically) a signal that includes a network identifier (for example, one or more of public land mobile network identifier (PLMN-ID) and closed subscriber group (CSG) identifier) that is uniquely assigned to a given radio access network (e.g., radio access network 110) associated with the one or more base stations 130. Although a single base station 130 is shown in FIG. 1 as being implemented at the radio access network 110, the radio access network 110 may include any number of base stations 130 each providing radio communication coverage in a given geographic area. The UE 120 attempts to connect to a desired radio access network (for example, a radio access network 110 that is uniquely identified in a Subscriber Identity Module (SIM) card that is secured to the user equipment 120) by initiating a scanning process and then connects to the radio access network 110, for example, via a radio communication link 170, using a frequency channel that is identified based on the scanning process. In accordance with embodiments, the radio access network 110 is a network that is controlled, for example, by a mobile operator, to provide shared radio spectrum services (e.g., CBRS services) to subscriber devices such as UE 120. To provide shared radio spectrum services, frequencies are dynamically allocated to the radio access network 110 from a shared radio spectrum (for example, 3550 MHz-3700 MHz in the CBRS band) that are allocable for primary usage by incumbent users. In certain cases, to provide shared radio spectrum services to subscriber devices, a mobile operator may establish a PAL protection area for protecting exclusive use of channels from the shared radio spectrum based upon the mobile operator's acquisition of PAL rights. In other cases, the mobile operator may rely on GAA to provide shared radio spectrum services to the subscriber devices.

The communication system 100 further includes a spectrum allocation system (SAS) 140 (also referred to as spectrum allocation server) that manages use of spectrum for the shared radio spectrum services. In some embodiments, the communication system 100 includes a domain proxy server 150 that is configured to communicate with SAS 140 on behalf of multiple base stations (also referred to as citizen broadband service devices (CBSD) in CBRS) or network of base stations 130 via an interface 160, which may be wired or wireless interface (also referred to as SAS-CBSD interface). Further, the domain proxy server 150 is configured to communicate with base stations via an interface 180, which may be wired or wireless interface. In FIG. 1, the domain proxy server is shown as a separate entity from the radio access network 110, in some embodiments, the functionality of the domain proxy server 150 may be implemented directly on one or more network terminals (e.g., base station 130) within the radio access network 110.

In accordance with some embodiments, the spectrum allocation system 140 may include one or more computing servers that receives a spectrum allocation request from the domain proxy server 150 or a registered base station (e.g., base station 130 within the radio access network 110), and in turn allocates the spectrum (i.e., a frequency range specified by low and high frequency values) according to the operational parameters (e.g., geographical location of the base station 130), orientation of the antennas, and transmit power level) included in the spectrum allocation request. The SAS 140 may allocate a PAL reserved channel if the base station 130 (or domain proxy server) is associated with an authorized PAL user. Otherwise, the SAS 140 allocates the GAA spectrum. In case the domain proxy server 150 is requesting allocation on behalf of multiple base stations 130, the domain proxy server 150 may aggregate the request for allocation received from multiple base stations 130 before routing the request to the SAS 140.

As described previously, since radio frequencies are dynamically allocated to the network 110 based on the availability of frequencies (for example, after allocation to incumbent and PAL users) within the shared radio spectrum, in accordance with embodiments, the UE 120 is configured to maintain a radio frequency scan list that indicates a prioritized order with which a plurality of radio frequencies selected from the shared radio spectrum are to be scanned. In accordance with some embodiments, the radio frequency scan list is provisioned at a memory (UE's 120 local memory or SIM memory) of the UE 120. Such a radio frequency scan list when provisioned at the user equipment 120 reduces the number of frequencies (or channels) that the user equipment 120 needs to scan in order to connect to a desired radio access network. This reduction in the number of frequencies further reduces the amount of time it takes for the UE 120 to connect to the desired radio access network. In accordance with some embodiments, the domain proxy server 150 and the UE 120 are provisioned with a common radio frequency scan list (i.e., with same prioritized order of frequencies) so that domain proxy server 150 can request for spectrum allocation, on behalf of the radio access network 110, from the SAS 140 in accordance with the prioritized order identified in the common radio frequency scan list.

Figure 2:
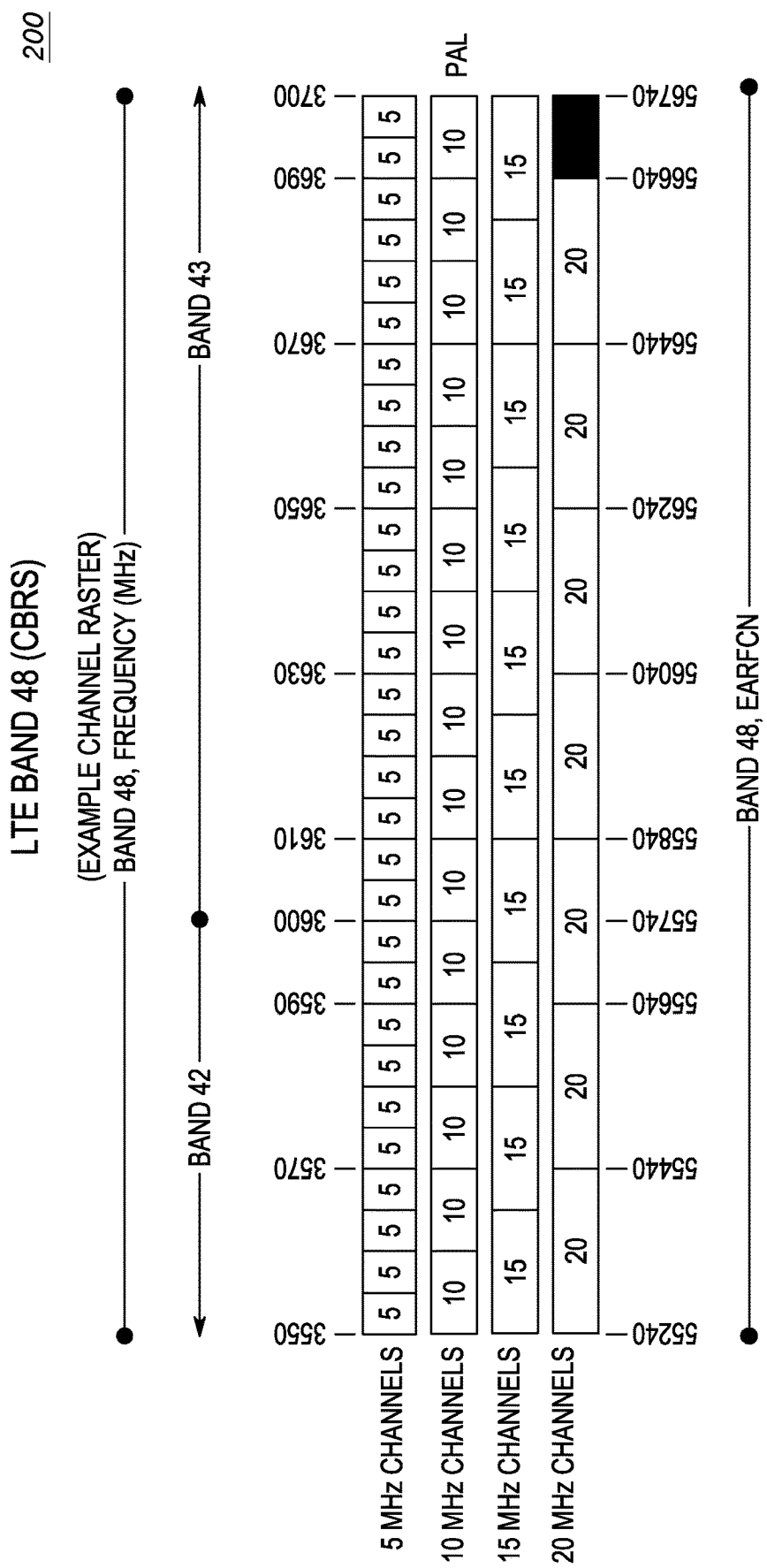
FIG. 2 illustrates an example of channels available in a shared radio spectrum in accordance with some embodiments.

Referring to FIG. 2, an example of channels available in a shared radio spectrum 200 is shown in accordance with some embodiments. For example, the shared radio spectrum 200 corresponds to channels available for use in LTE band 48 (i.e., CBRS band) covering 150 MHz of spectrum. An E-UTRA (Evolved Universal Terrestrial Radio Access) Radio Frequency Channel Number (EAFCN) specifies a frequency within an LTE band. For example, as shown in FIG. 2, for band 48, the lowest EARFCN value ($N_{EARFCN\_LOW}$) is identified by channel number '55240' that specifies a lowest frequency value ($F_{LOW}$) '3550.0 MHz' in the CBRS band. The highest EARFCN value ($N_{EARFCN\_HIGH}$) is identified by channel number '56740' that specifies a highest frequency value ($F_{HIGH}$) '3700.0 MHz' in the CBRS band. In other words, the lowest possible frequency available within the LTE band 48 used for CBRS is 3550 MHz and the highest possible frequency available within the LTE band 48 used for CBRS is 3700 MHz. Band 48 EARFCNs are specified in 100 KHz increments, and accordingly a total of 1500 EARFCN increments are needed to specify all frequencies in the LTE band 48.

As described previously, in the worst case scenario, the user equipment 120 shown in FIG. 1 may need to scan fifteen hundred (1500) channels (corresponding to 1500 EARFCNs) before it can connect to its desired radio access network. If each channel requires 60 millisecond (msec) of time (assuming an estimate of 2*5 msec of time needed for synchronization in addition to 50 msec needed to receive broadcast packet from a base station 130 containing the network identifier), then scanning 1500 channels in the LTE 48 band requires up to 90 seconds, which is relatively a very long time to connect to a desired radio access network. In accordance with embodiments, the time required to connect to the radio access network 110 by the user equipment 120 is reduced by maintaining a common rule set (i.e., prioritized order of frequencies as indicated in the radio frequency scan list) at both the domain proxy server 150 and user equipment 120. The common rule set allows the domain proxy server 150 to procure the CBRS spectrum in accordance with the prioritized order of the frequencies indicated in the radio frequency scan list and also the user equipment 120 to scan the CBRS spectrum in accordance with the prioritized order of the frequencies as indicated in the radio frequency scan list in order to connect to the radio access network 110. In accordance with some embodiments, the prioritized order with which the frequencies are to be scanned in the CBRS band is determined as a function of the channel bandwidth needed for the shared radio spectrum service provided by the radio access network 110 and further as a function of the desired frequency reuse factor that is predefined for the radio access network 110.

In accordance with some embodiments, the domain proxy server 150 attempts to procure the CBRS spectrum by first identifying the channel bandwidth needed for or associated with a particular customer network, for example, radio access network 110. The channel bandwidth needed is determined as a function of the communication service provided by the radio access network 110. For example, if the customer network is using a PAL license or requires voice communication service, then the domain proxy server 150 requests for 10 MHz channels within the shared radio spectrum 200 from the SAS 140 and procures 10 MHz channels. Else, if the customer network is serving only user equipments 120 enabled to perform IIoT (Industrial Internet of Things) communication services, then the domain proxy server 150 requests for 5 MHz channels within the shared radio spectrum 200 from the SAS 140 and procures 5 MHz channels. Else, if the customer network is providing video communication services, then the domain proxy server 150 requests for 20 MHz channels within the shared radio spectrum 200 from the SAS 140 and procures 20 MHz channels. In other cases, the domain proxy server may request for 15 MHz channels from the shared radio spectrum 200 from the SAS 140 and procures 15 MHz channels. In other words, the domain proxy server 150 procures channels of particular bandwidth sizes (e.g., 5 MHz, 10 MHz, 15 MHz, 20 MHz, etc.,) depending on the type of communication services (e.g., IIOT, PAL, video, text, data etc.,) supported by the radio access network 110.

After the domain proxy server 150 has identified the channel bandwidth needed for the customer network, the domain proxy server 150 further identifies the frequency reuse factor that is predefined for a particular customer network. The frequency reuse factor may be identified as one of including, but not limited to, one (1), three (3), four (4), seven (7), nine (9), twelve (12), thirteen (13), sixteen (16), nineteen (19), twenty-one (21), twenty-five (25), twenty-seven (27), twenty-eight (28), thirty-one (31) etc.

Since CBRS uses shared radio spectrum, it is unlikely that any one customer network will be able to procure every channel, therefore, as a practical matter, some of the larger frequency reuse factors may not be supported. FIG. 3 shows a table 300 illustrating the available frequency reuse factors for the different channel bandwidths.

As shown in FIG. 3, the table 300 includes a first column 310 that identifies the channel bandwidth in MHz, a second column 320 that identifies the maximum number of CBRS channels that are available corresponding to the channel bandwidth identified in the first column 310, a third column 330 that identifies the possible frequency reuse factors corresponding to the channel bandwidth identified in the first column 310, and a fourth column 340 that identifies the practical frequency reuse factors while excluding the larger frequency reuse factors that are unlikely to be supported. As shown in the table 300, for a given channel bandwidth size of 5 MHz, the maximum number of CBRS channels available is thirty (30), possible frequency reuse factors are one (1), three (3), four (4), seven (7), nine (9), twelve (12), thirteen (13), sixteen (16), nineteen (19), twenty-one (21), twenty-five (25), twenty-seven (27), and twenty-eight (28), and practical frequency reuse factors are one (1), three (3), four (4), seven (7), nine (9), and twelve (12); for a given channel bandwidth size of 10 MHz, the maximum number of CBRS channels available is fifteen (15), possible frequency reuse factors are one (1), three (3), four (4), seven (7), nine (9), twelve (12), and thirteen (13), and practical frequency reuse factors are one (1), three (3), and four (4); for a given channel bandwidth size of 15 MHz, the maximum number of CBRS channels available is ten (10), possible frequency reuse factors are one (1), three (3), four (4), seven (7), and nine (9), and practical frequency reuse factors are one (1), and three (3); and for a given channel bandwidth size of 20 MHz, the maximum number of CBRS channels available is seven (7), possible frequency reuse factors are one (1), three (3), four (4), seven (7), and practical frequency reuse factors are one (1) and three (3).

In accordance with some embodiments, the table 300 and/or subsets of the table 300 may be maintained at the domain proxy server 150 (or at the base station 130) for use in procuring channels on behalf of the radio access network 110 from the SAS 140 in accordance with frequency reuse factors that are mapped to a given channel bandwidth. In accordance with embodiments, the purpose of frequency reuse channel sets is to take into account the shared radio spectrum's incumbent users, who have the highest priority in various portions of the spectrum 200 and to group the available channels into frequency reuse channel sets that are used within a particular radio access network 110. Since there is a possibility of an incumbent being present or receiving interference from an adjacent frequency band, some frequency reuse channel sets within the list of possible frequency reuse channels may provide better choice for the domain proxy server 150 when requesting spectrum allocation from the SAS 140 on behalf of the base stations 130 in the radio access network 110.

FIGS. 4A-4D illustrate example channel sets for some of the possible reuse factors. In accordance with embodiments, the frequency reuse channel sets as shown in FIGS. 4A-4D are provisioned at the user equipment 120 as part of the radio frequency scan list. The number of frequency reuse channel sets may be determined using a function: S=integer part of (R/(B*N)), where S is the number of frequency reuse channel sets, R is the total size of shared radio spectrum, B is the channel bandwidth permitted for a communication service supported by the radio access network 110, and N is the frequency reuse factor that is predefined for the radio access network 110. In accordance with some embodiments, the user equipment 120 selects a particular frequency reuse channel set based on the prioritized order indicated in the radio frequency scan list to perform channel scanning. The prioritized order of radio frequencies is further determined based on the channel bandwidth and desired frequency reuse factor used by the associated radio access network in order to perform channel scanning process. In some embodiments, when the user equipment 120 performs the scanning, it starts scanning the center frequencies within a selected frequency reuse channel set in the order of lowest center frequency to the highest center frequency within the selected frequency reuse channel set and then further proceeds to scan frequencies in the next frequency reuse channel set in accordance with the prioritized order.

As shown in FIG. 4A, a table 410 illustrates some example frequency reuse channel sets that are available for frequency reuse factors of three (3), four (4), seven (7), nine (9), and twelve (12) for a given channel bandwidth of 5 MHz in accordance with some embodiments. As shown in table 410, when the frequency reuse factor 'N' is three (3) and bandwidth size is 5 MHz, there are ten (10) frequency reuse channel sets that are available from the CBRS band, where each frequency reuse channel set includes three (3) possible center frequencies. For example, the 'reuse set 1' field within the table 410 includes center frequencies 3552.5, 3602.5, and 3652.5; the 'reuse set 2' field within the table 410 includes center frequencies 3557.5, 3607.5, 3657.5; and so on. Similarly, when the frequency reuse factor 'N' is four (4) and bandwidth size is 5 MHz, there are seven (7) frequency reuse channel sets that are available from the CBRS band, where each frequency reuse channel set includes four (4) possible center frequencies; when the frequency reuse factor 'N' is seven (7) and bandwidth size is 5 MHz, there are four (4) frequency reuse channel sets that are available from the CBRS band, where each frequency reuse channel set includes seven (7) possible center frequencies; when the frequency reuse factor 'N' is nine (9) and bandwidth size is 5 MHz, there are 3 frequency reuse channel sets that are available from the CBRS band, where each frequency reuse channel set includes nine (9) center frequencies; and when the frequency reuse factor 'N' is twelve (12) and bandwidth size is 5 MHz, there are 2 frequency reuse channel sets that are available from the CBRS band, where each frequency reuse channel set includes twelve (12) center frequencies.

As shown in FIG. 4B, a table 420 illustrates some example frequency reuse channel sets that are available for frequency reuse factors of three (3) and four (4) for a given channel bandwidth of 10 MHz in accordance with some embodiments. As shown in table 420, when the frequency reuse factor 'N' is three (3) and bandwidth size is 10 MHz, there are five (5) frequency reuse channel sets that are available from the CBRS band, where each frequency reuse channel set includes three (3) possible center frequencies. For example, the 'reuse set 11' field within the table 420 includes center frequencies 3555.0, 3605.0, 3655.0; the 'reuse set 12' field within the table 420 includes center frequencies 3565.0, 3615.0, 3665.0; and so on. Similarly, when the frequency reuse factor 'N' is four (4) and bandwidth size is 10 MHz, there are three (3) frequency reuse channel sets that are available from the CBRS band, where each frequency reuse channel set includes four (4) possible center frequencies.

As shown in FIG. 4C, a table 430 illustrates some example frequency reuse channel sets that are available for possible frequency reuse factor of three for a given channel bandwidth of 15 MHz in accordance with some embodiments. As shown in table 430, when the frequency reuse factor 'N' is three (3) and bandwidth size is 15 MHz, there are three (3) frequency reuse channel sets that are available from the CBRS band, where each frequency reuse channel set includes three (3) possible center frequencies. For example, the 'reuse set 16' field within the table 430 includes center frequencies 3557.5, 3602.5, 3647.5; the 'reuse set 17' field within the table 430 includes center frequencies 3572.5, 3617.5, 3662.5; and so on.

As shown in FIG. 4D, a table 440 illustrates some example frequency reuse channel sets that are available for frequency reuse factor of three (3) for a given channel bandwidth of 20 MHz in accordance with some embodiments. As shown in table 440, when the frequency reuse factor 'N' is three (3) and bandwidth size is 20 MHz, there are two (2) frequency reuse channel sets that are available from the CBRS band, where each frequency reuse channel set includes three (3) possible center frequencies. For example, the 'reuse set 19' field within the table 440 includes center frequencies 3560.0, 3600.0, 3640.0 and the 'reuse set 20' field within the table 440 includes center frequencies 3580.0, 3620.0, 3660.0.

In the example channel sets shown in FIGS. 4A-4D, frequency channel sets that are available corresponding to a frequency reuse factor 'N' of one (1) is not shown. Public LTE communication systems are deployed with frequency reuse factor of one (1). However, this may make initial acquisition of a radio access network a trivial problem since there is only one channel to be scanned. For example, there are thirty (30) 5 MHz channels (for example, with center frequencies 3552.5, 3557.5, 3562.5 . . . 3697.5), ten (10) 15 MHz channels (for example, with center frequencies 3557.5, 3572.5, 3587.5 . . . 3692.5), fifteen (15) 10 MHz channels (for example, with center frequencies 3555.0, 3565.0, 3575.0 . . . 3695.0), and seven (7) possible 20 MHz channels (for example, with center frequencies 3560.0, 3580.0, 3600.0 . . . 3680.0), any of which can be used with a frequency reuse factor 'N' of one (1). When the frequency reuse factor 'N' greater than one (1) is desired for performance improvement, N=3 is a possible frequency reuse factor that works with 5 MHz, 10 MHz, 15 MHz, and 20 MHz channel bandwidths, and may be used by mobile operator to deploy the radio access network 110.

Figure 5:
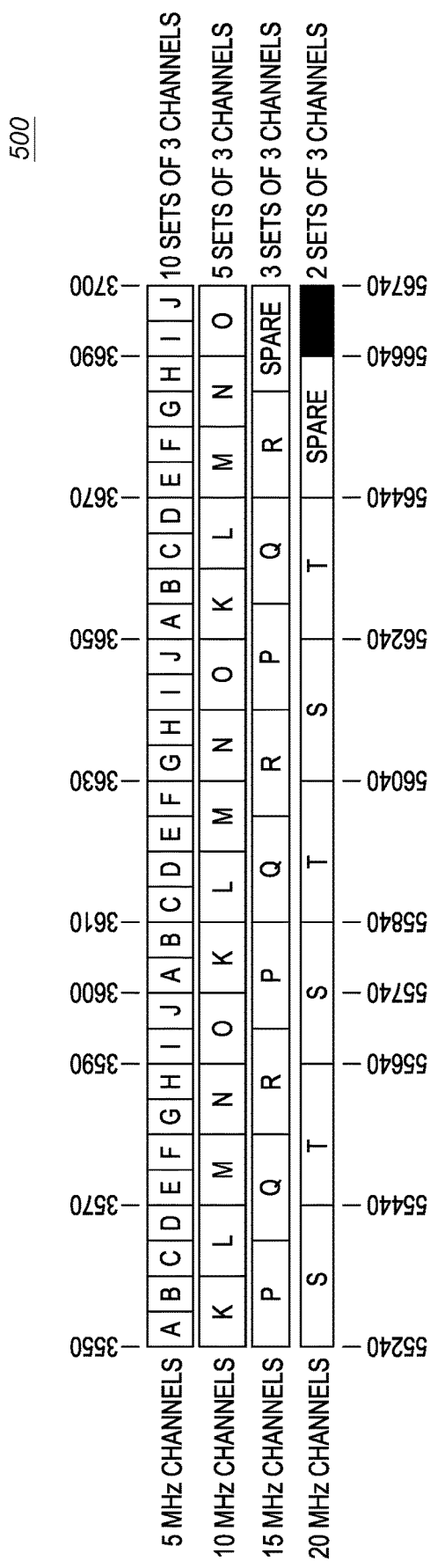
FIG. 5 illustrates some example channel sets that are available corresponding to different channel bandwidths of 5 MHz, 10 MHz, 15 MHz, and 20 MHz in the shared radio spectrum for a given frequency reuse factor of three (3) in accordance with some embodiments.

Example channel sets for frequency reuse factor of 'N'=3 are illustrated in FIG. 5. As shown in FIG. 5, when the frequency reuse factor 'N' is three, there are ten (10) sets of three (3) 5 MHz channels, five (5) sets of three (3) 10 MHz channels, three (3) sets of three (3) 15 MHz channels, and two (2) sets of three (3) 20 MHz channels that are available from a shared radio spectrum 500 (e.g., CBRS band). In other words, for example, for 10 MHz channels, five different radio access networks can overlap geographically, and they are each assigned three (3) 10 MHz channels which can be used in a N=3 reuse pattern.

Although FIGS. 2 and 5 illustrate channel sets that are aligned between particular range of frequencies (for example, 5 MHz, 10 MHz, and 15 MHz channels are each aligned between 3550-3700 and 20 MHz channel is aligned between 3550-3690), the alignment of radio frequencies (i.e. range of radio frequencies) included in the scan list may vary depending on the common rule set provisioned at the domain proxy server 150 and user equipment 120. For example, the common rule set may specify that the domain proxy server 150 and user equipment 120 are in agreement with the use of channel alignments 3560-3700 (instead of 3550-3690 shown in FIGS. 2 and 5) for 20 MHz channels.

In some embodiments, the common rule set (and therefore the radio frequency scan list) may be updated to modify the channel alignments when a scan of the radio frequencies between the channel alignments currently specified in the scan list is unsuccessful. For example, the center frequencies to be scanned may be updated at the radio frequency scan list to specify the 20 MHz channels between 3560 and 3700 instead of the previously scanned 20 MHz channels between 3550 and 3690. Further, the center frequencies shown in FIGS. 4A-4D are provided herein as examples, and that other center frequencies are possible based on the channel alignments as specified in the common rule set between the domain proxy server 150 and user equipments 120.

Figure 6:
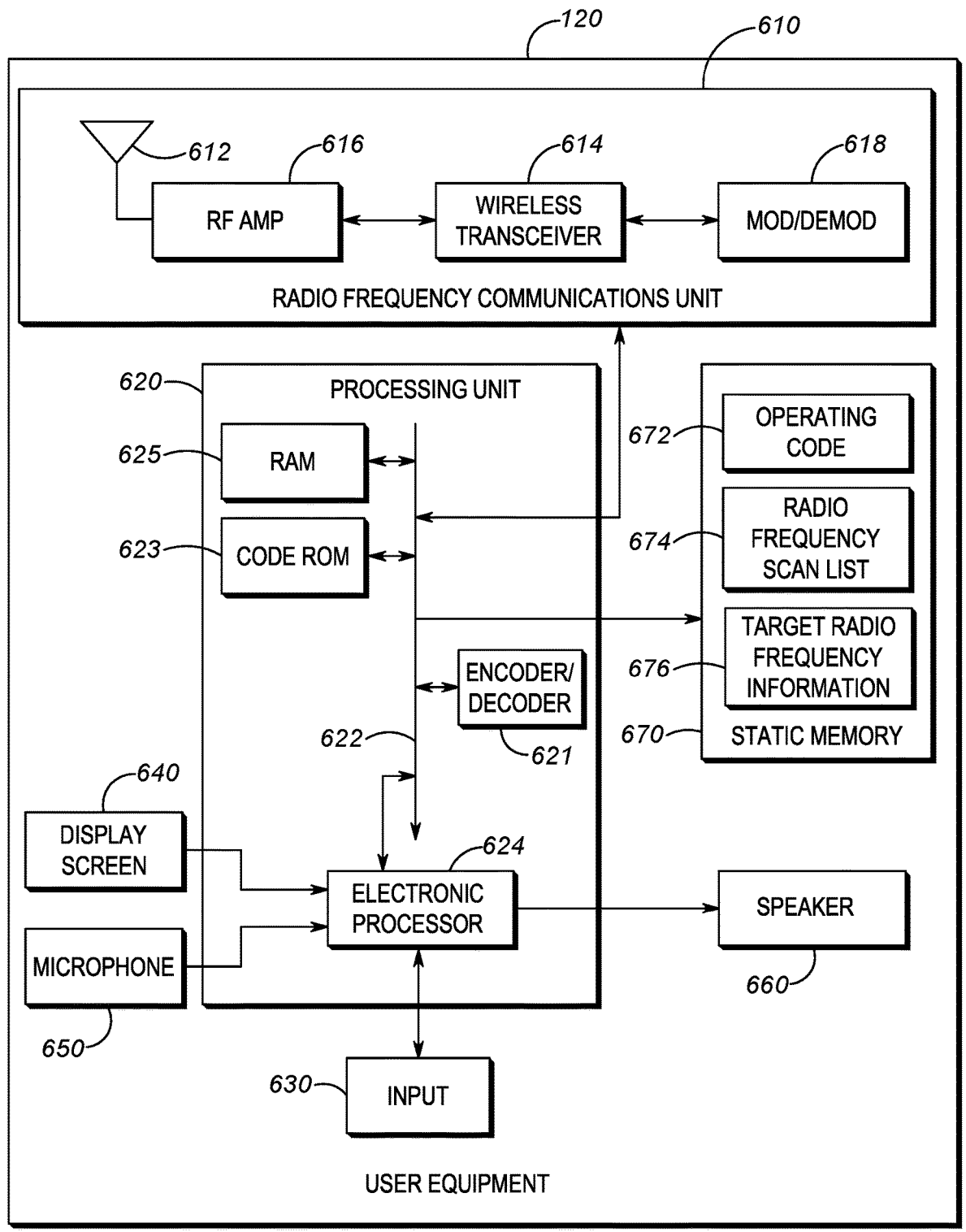
FIG. 6 is a block diagram of a user equipment shown in FIG. 1, in accordance with some embodiments.

FIG. 6 is an example functional block diagram of a user equipment 120 operating within the communication system 100 in accordance with some embodiments. While FIG. 6 represents a user equipment 120 described above with respect to FIG. 1, depending on the type of the user equipment, the user equipment 120 may include fewer or additional components in configurations different from that illustrated in FIG. 2.

As shown in FIG. 6, the user equipment 120 includes a radio frequency communications unit 610 coupled to a common data and address bus 622 of a processing unit 620. The user equipment 120 may also include an input 630 and a display screen 640, each coupled to be in communication with processing unit 620. The input 630 may include an alphanumeric physical keypad (or virtual keypad in cooperation with capacitive touch display screen 640) for inputting text for communications. The display screen 640 may further function to display communications received via communications unit 610. A microphone 650 captures audio from a user that is further vocoded by processing unit 620 and transmitted as voice data by communications unit 610 to other user equipments in the system 100. A communications speaker 660 reproduces audio that is decoded from voice data transmissions received from other user equipments via the communications unit 610.

The processing unit 620 may also include an encoder/decoder 621 with an associated code Read Only Memory (ROM) 623 for storing data for initializing system components and encoding and/or decoding voice or other traffic information (including image data, audio data, video data, text data, control signals, etc.) that may be transmitted or received by the user equipment 120. The processing unit 220 may further include an electronic processor 624 coupled, by the common data and address bus 622, to the encoder/decoder 621, a random access memory (RAM) 625, and a static memory 670.

The radio frequency communications unit 610 includes a receiver and transmitter (e.g., transceiver) having an antenna 612. The radio frequency communications unit 610 has a transceiver 614 coupled to the antenna 612 via a radio frequency amplifier 616. The transceiver 614 may be a transceiver operating in accordance with one or more standard protocols, such as a digital mobile radio (DMR) transceiver, a Project 25 (P25) transceiver, a terrestrial trunked radio (TETRA) transceiver, a Bluetooth transceiver, a long term evolution (LTE) transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, and/or other similar type of wireless transceiver configurable to communicate via a wireless network. The transceiver 614 is also coupled to a combined modulator/demodulator (MOD/DEMOD) 618 that is coupled to the encoder/decoder 621.

The electronic processor 624 has ports for coupling to the input 230 and to the display screen 240. The electronic processor 624 further has ports for coupling to the microphone 650 and to the speaker 660. In some embodiments, the static memory 670 may store operating code 672 for the electronic processor 624 that, when executed by the electronic processor 224, perform one or more of the operations (for example, method 700 shown in FIG. 7) set forth in the figures and accompanying text. Static memory 670 may comprise, for example, a hard disk drive (HDD), an optical disk drives (ODD) such as a compact disk (CD) drive or digital versatile disc (DVD) drive, a solid-state drive (SSD), a tape drive, a flash memory drive, SIM memory, or a tape drive, to name a few. In accordance with some embodiments, the static memory 670 corresponds to a memory at a subscriber identity module (SIM) card that is associated with the user equipment 120.

In accordance with some embodiments, the static memory 670 further includes a radio frequency scan list 674 that indicates a prioritized order with which a plurality of radio frequencies selected from a shared radio spectrum (e.g., CBRS band) 200 are to be scanned by the user equipment 120. The radio frequency scan list 674 may include a plurality of subsets of frequency reuse channels sets, where each subset of frequency reuse channel sets is mapped to a different combination of channel bandwidth and frequency reuse factor as shown in FIGS. 4A-4D. In some embodiments, all the frequency reuse channel sets (for example, the reuse sets 1-20 as shown in FIGS. 4A-4D) are included in the radio frequency scan list 674. In these embodiments, since each subset of channel sets is mapped to a particular combination of channel bandwidth and frequency reuse factor, the user equipment 120 is configured to identify which channel sets to select in order to perform the scanning. In other embodiments, the radio frequency scan list 674 stores only a particular subset of frequency reuse channel sets depending on the channel bandwidth and frequency reuse factor that are desired for the radio access network 110 associated with the user equipment 120. For example, as shown in FIG. 4A, the reuse channel sets 1-10 each including three different center frequencies are only included in the radio frequency scan list 674 if the radio access network 110 associated with the user equipment 120 is supporting a communication service (e.g., IIoT communications service) that requires channel bandwidth of 5 MHz and further having a frequency reuse factor 'N' of three (3). Similarly, if the radio access network 110 associated with the user equipment 120 is supporting a video communication service that requires channel bandwidth of 20 MHz and further having a frequency reuse factor 'N' of three (3), the reuse sets 19 and 20 each including three different center frequencies as shown in FIG. 4D are only included in the radio frequency scan list 674. In these embodiments, the number of frequency reuse channel sets to be included in the radio frequency scan list 674 may be determined using a function: S=integer part of (R/(B*N)), where S is the number of frequency reuse channel sets, R is the total size of shared radio spectrum, B is the channel bandwidth associated with a communication service supported by the radio access network 110, and N is the frequency reuse factor.

In accordance with some embodiments, each radio frequency that is selected to be included in the radio frequency scan list 674 is arranged according to the prioritized order and further each radio frequency is associated with a scanning rank. For example, when the frequency reuse factor 'N' is three (3) and the channel bandwidth permitted for a video communication service is 20 MHz, the radio frequencies that are selected to be included in the radio frequency scan list 674 correspond to the radio frequencies that are included in the 'reuse set 19' and 'reuse set 20' as shown in FIG. 4D. In this example, the center radio frequencies (i.e., 3560, 3600, 3640) that are included in 'reuse set 19' is assigned a higher scanning rank than the center radio frequencies (i.e., 3580, 3620, 3660) that are included in 'reuse set 20'. Accordingly, the user equipment 120 is configured to scan the center radio frequencies in 'reuse set 19' before the center frequencies in 'reuse set 20'. In other words, the UE 120 uses the scanning ranks assigned to different radio frequencies that are selected to be included in the radio frequency scan list 674 to determine the prioritized order with which the radio frequencies are to be scanned.

In some embodiments, each frequency within a given channel set may have a scanning rank that is different from other frequencies listed in the given channel set. In these embodiments, the scanning rank of a particular frequency listed in the given channel set may be determined based on a position of the particular frequency within the shared radio spectrum 200. For example, in one embodiment, a frequency at a lower position (or lower frequency value) within the shared radio spectrum 200 may be assigned a higher scanning rank than a frequency at the higher position (or higher frequency value) within the shared radio spectrum 200. In other words, in the example channel sets shown in FIG. 4D, the center frequency '3560' has a higher scanning rank than the center frequencies '3600' and '3640' within the 'reuse set 19' because the center frequency '3560' has a lower frequency value than the center frequencies '3600' and '3640'. In other embodiments, the frequency at a higher position within the shared radio spectrum may be assigned a higher scanning rank than the frequencies at the lower position. In yet other embodiments, each center frequency in a given reuse set may be assigned an arbitrary ranking provided that the respective ranking assigned for each center frequency in the given reuse set is common at both the user equipment 120 and the domain proxy server 150.

The static memory 670 further maintains target radio frequency information 676 that identifies a frequency or frequency band which was most recently used by the user equipment 120 to connect to the radio access network 110. In other words, when the user equipment 120 performs the scanning in accordance with the prioritized order indicated in the radio frequency scan list 674, the user equipment 120 may successfully complete the scanning process when the network identifier broadcasted by the base station 130 on a particular scanned frequency matches with the network identifier stored at the user equipment 120. When the scanning process is successful, the user equipment 120 connects to the radio access network 110 using the frequency on which the scanning was successful. This particular frequency is being referred to as target radio frequency, and is further updated at the static memory 670. In accordance with some embodiments, when the user equipment 120 is disconnected from the radio access network 110, for example, due to link failure or device failure, the user equipment 120 attempts to reconnect to the radio access network 110. During this process, the user equipment 120 identifies a particular frequency reuse channel set in which the most recent target radio frequency (as indicated by the target radio frequency information 676 at the static memory) is included and further prioritizes the scanning on frequencies included within the selected frequency reuse channel set. Similarly, when the user equipment 120 powers up, the user equipment 120 can begin its scanning on frequencies included within the channel set in which the most recently used target radio frequency is included.

The input 630 may include a push-to-talk (PTT) key that functions to activate a transmit function in a half or full-duplex communication device, transitioning the user equipment 120 (when activated) from a listen-only mode to a transmit-only mode (for half-duplex communication devices) or transmit and receive mode (for full-duplex communication devices). The input 630 may further include a user interface to enable the user to switch, for example, from LMR mode of operation to CBRS mode of operation, in response to which, the user equipment 120 begins its scanning process in the CBRS band in accordance with the prioritized order indicated in the radio frequency scan list 674.

Figure 7:
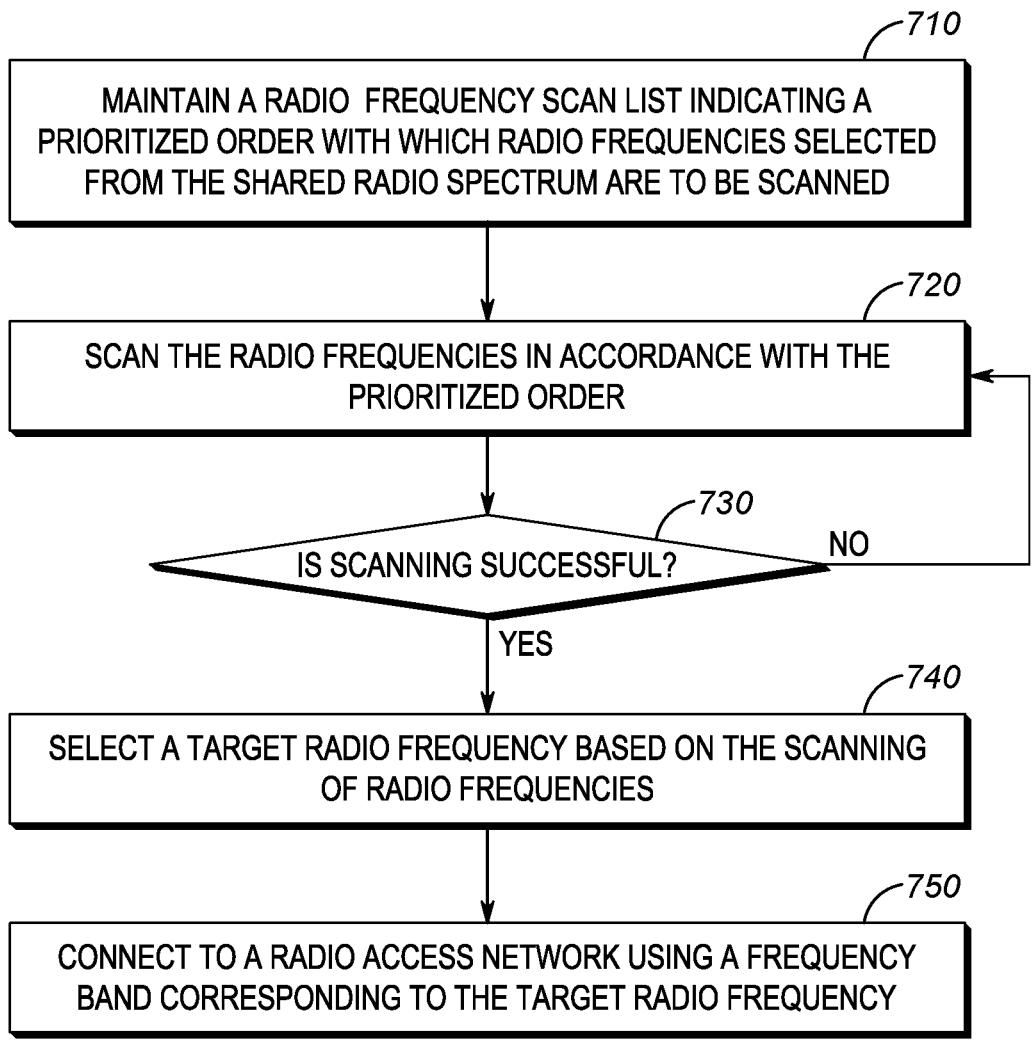
FIG. 7 illustrates a flowchart of a method of operating a user equipment to connect to a radio access network shown in FIG. 1 in accordance with some embodiments.

FIG. 7 illustrates a flow chart diagram of a method 700 of operating a user equipment 120 to connect to a radio access network 110 in which communication frequencies are dynamically allocated from a shared radio spectrum 200. While a particular order of processing steps, message receptions, and/or message transmissions is indicated in FIG. 7 as an example, timing and ordering of such steps, receptions, and transmissions may vary where appropriate without negating the purpose and advantages of the examples set forth in detail throughout the remainder of this disclosure. The method shown in FIG. 7 can be performed by one or more components, for example, electronic processor 624, memory 670, and wireless transceiver 614 of the user equipment 120, and will be described with reference to the functions and components of the system 100.

At block 710, the user equipment 120 maintains a radio frequency scan list 674 that indicates a prioritized order with which a plurality of radio frequencies selected from the shared radio spectrum are to be scanned. In accordance with some embodiments, the radio frequency scan list 674 is provisioned at a memory of the integrated circuit (for example, a subscriber identity module (SIM) card storing subscriber credentials and network information corresponding to the radio access network 110) that may be provided by the mobile operator for enabling the user equipment 120 to connect to the radio access network 110. In some embodiments, the radio frequency scan list 674 is provisioned at a local memory of the user equipment 120. In these embodiments, the radio frequency scan list 674 may be downloaded from a remote server or from the domain proxy server 150. In other embodiments, the user equipment's 120 code plug (i.e., a configuration file stored at the memory 670 to configure the channels and operating parameters of the UE 120) can be configured to update the radio frequency scan list 674. In these embodiments, the user equipment's 120 code plug may be provisioned with the radio frequency scan list 675 at the factory site, or at the operating site via wired or near field connection, over the wide area network (LMR or CBRS), or via a wireless connection (e.g., Wi-Fi). Provisioning the memory of the SIM card (instead of UE's local memory) with the radio frequency scan list optimizes the scanning time further, because the modem 618 (which reads the SIM directly) can power up independently of the UE's host controller/processor (which reads the code plug) and can begin scanning independently (without instruction from the host controller/processor). In some embodiments, the radio frequency scan list 674 is updated at the user equipment 120 in response to a change in the channel bandwidth or a change in the frequency reuse factor that is used by the radio access network 110 associated with the user equipment 120.

At block 720, the user equipment 120 scans the radio frequencies in accordance with the prioritized order. In accordance with some embodiments, the user equipment 120 begins it scanning process when the user equipment 120 (or in particular, modem 618) is powered on to operate in a shared radio spectrum services (i.e., CBRS) mode or when it receives an input (for example, from the user via the input 630) to operate in the shared radio spectrum services mode. In accordance with some embodiments, the user equipment 120 may be a converged device that is configured to switch between land mobile radio (LMR) mode of operation (i.e., for narrow band operation) and CBRS mode of operation (i.e., for broadband operation). In such cases, the user equipment 120 may begin scanning the shared radio spectrum 200 when it receives input to switch to CBRS mode of operation for accessing the shared radio spectrum service.

In accordance with embodiments, the prioritized order of the plurality of radio frequencies selected from the shared radio spectrum is determined as a function of the channel bandwidth associated with the communication service supported by the radio access network 110 and desired frequency reuse factor used by the radio access network 110. For example, when the channel bandwidth is 20 MHz and the frequency reuse factor is three (3), the prioritized order may indicate that the frequencies are to be scanned in the order of the frequencies listed in 'reuse set 19' followed by the frequencies listed in 'reuse set 20' as shown in FIG. 4D. In this case, the user equipment 120 may scan the center frequencies in the prioritized order of 3560, 3600, 3640, 3580, 3620, 3660. For example, the user equipment 120 may begin by scanning the first radio frequency i.e. '3560' in the prioritized order. As used herein, the term "scan" or "scanning" refers to a process by which the user equipment 120 tunes its wireless transceiver 614 to a particular scan frequency and further monitors transmissions on this particular frequency to determine whether the transmissions identify a network identifier of a radio access network (for example, as programmed in the SIM memory) with which the user equipment 120 is attempting to connect.

Next, at block 730, the user equipment 120 determines whether the scanning is successful. In accordance with some embodiments, during scanning of a particular radio frequency, the user equipment 120 may receive a first network identifier broadcasted (for example, by the base station 130 of the radio access network 110) on the particular radio frequency. The user equipment 120 then compares a second network identifier (for example, as programmed at the memory of the SIM card) configured at the user equipment 120 with the first network identifier broadcasted by the radio access network 110. In accordance with some embodiments, the first and second network identifiers may be one or more of PLMN ID, CSG ID, and CBRS network identifier. When the first network identifier matches with the second network identifier, the user equipment 120 determines that the scanning is successful. In other words, the scanning is successful when the user equipment 120 is able to identify a target radio frequency with which a connection is to be established with the desired radio access network (e.g., as programmed at the SIM card). When the first network identifier does not match with the second network identifier or when no signal is received on the particular radio frequency being scanned, the user equipment 120 determines that the scanning is not successful. When the scanning is not successful, the user equipment 120 returns to block 720 to identify a next radio frequency in the prioritized order of the plurality of radio frequencies. For example, the user equipment 120 may identify a second radio frequency '3600' in the prioritized order of center frequencies 3560, 3600, 3640, 3580, 3620, 3660 included in the 'reuse set 19' and 'reuse set 20' shown in FIG. 4D. In this case, the second radio frequency '3600' is selected as the next radio frequency to be scanned because the second radio frequency '3600 has a higher rank than other center frequencies 3640, 3580, 3620, and 3660 included in 'reuse set 19' and 'reuse set 20', but lower rank than the first radio frequency i.e. '3560' which has been previously scanned. Accordingly, the user equipment 120 continues to identify and scan a next frequency in the plurality of radio frequencies included in the radio frequency scan list 674 in accordance with the prioritized order until a scan of one of the plurality of radio frequencies is successful.

Next, at block 740, when the user equipment 120 determines that the scanning is successful, the user equipment 120 selects a target radio frequency from the plurality of radio frequencies identified in the radio frequency scan list 674 based on the scanning of the plurality of radio frequencies. In other words, the user equipment 120 selects a target radio frequency at the frequency at which the scanning is successful. In accordance with some embodiments, the target radio frequency corresponds to a frequency band that is dynamically allocated from the shared radio spectrum to a radio access network 110 associated with the user equipment 120. For example, when the channel bandwidth is 20 MHz and the frequency reuse factor is three (3), the frequency band, corresponding to the center frequency '3600', that is allocated to the radio access network 110 is in the range of 3590 MHz to 3610 MHz.

Next, at block 750, the user equipment 120 connects to the radio access network 110 using the frequency band corresponding to the target radio frequency as determined at block 740. For example, the user equipment 120 connects to the radio access network 110 using the frequency band of 3590 MHz to 3610 MHz that is dynamically allocated to the radio access network 110 from the shared radio spectrum. In accordance with some embodiments, the user equipment 120 may provide its subscription information to the radio access network 110. The subscription information (e.g., credentials) may be used by the mobile operator (e.g., at a computer terminal) to authenticate the identity of the user equipment 120 before providing the device access to the shared radio spectrum service on the frequency band allocated to the radio access network 110.

In accordance with embodiments, system and methods described herein can be advantageously implemented to reduce the access time required by the user equipments to connects to its desired radio access network where communication frequencies are dynamically allocated from the shared radio spectrum, such as the CBRS spectrum. User equipments scanning the 150 MHz CBRS band in accordance with the embodiments described herein can reduce the access time to 4 seconds while scanning 150 MHz channels with conventional methods may take up to 90 seconds. Although the embodiments described herein are illustrated with examples of 150 MHz spectrum in the CBRS band, the embodiments described herein can be applied to scan any range of radio spectrum (including 3550 MHz-4200 MHz band) from which frequencies are dynamically allocated to radio access networks.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of operating a user equipment to connect to a radio access network in which communication frequencies are dynamically allocated from a shared radio spectrum, the method comprising:
   maintaining, by the user equipment, a radio frequency scan list that indicates a prioritized order with which a plurality of radio frequencies selected from the shared radio spectrum are to be scanned;
   scanning, by the user equipment, the plurality of radio frequencies in accordance with the prioritized order that is indicated in the radio frequency scan list;
   selecting, by the user equipment, a target radio frequency from the plurality of radio frequencies based on the scanning of the plurality of radio frequencies, the target radio frequency corresponding to a frequency band that is dynamically allocated from the shared radio spectrum to a radio access network associated with the user equipment; and
   connecting, by the user equipment, to the radio access network using the frequency band corresponding to the target radio frequency;
   determining the prioritized order of the plurality of radio frequencies as a function of a channel bandwidth associated for a communication service supported by the radio access network and a frequency reuse factor;
   wherein the radio frequency scan list includes a plurality of frequency reuse channel sets, each channel set including a number of frequencies corresponding to the frequency reuse factor, and further wherein a number of frequency reuse channel sets in the radio frequency scan list is determined using a function:
   S=integer part of (R/(B*N)),
   where S is the number of frequency reuse channel sets, R is total size of the shared radio spectrum, B is the channel bandwidth associated with the communication service supported by the radio access network, and N is the frequency reuse factor.

2. The method of claim 1, further comprising:
   updating, by the user equipment, the prioritized order in the radio frequency scan list in response to a change in the channel bandwidth or a change in the frequency reuse factor.

3. The method of claim 1, wherein the channel bandwidth is selected from a group consisting of a 5 MHz channel bandwidth, a 10 MHz channel bandwidth, a 15 MHz channel bandwidth, and a 20 MHZ channel bandwidth.

4. The method of claim 1, further comprising:
   determining that a connection to the radio access network is lost;
   identifying one of the plurality of frequency reuse channel sets that includes a most recent target radio frequency used by the user equipment to connect to the radio access network;
   selecting a next radio frequency within the identified one of the frequency reuse channel sets, wherein the next radio frequency has a higher rank than other radio frequencies in the identified one of the frequency reuse channel sets other than the most recent target radio frequency; and
   when scanning of the next radio frequency is successful, connecting to the radio access network using a frequency band corresponding to the next radio frequency.

5. The method of claim 1, wherein the radio frequency scan list represents a prioritized order of radio frequencies that is provisioned at a domain proxy server, the domain proxy server being configured to request a spectrum access system for dynamic allocation of frequencies for the radio access network in accordance with the prioritized order of the radio frequencies.

6. The method of claim 1, wherein selecting further comprises:
   determining whether scanning of a first radio frequency of the plurality of radio frequencies is successful; and
   selecting the first radio frequency as the target radio frequency when the scanning of the first radio frequency is successful.

7. The method of claim 6, wherein determining whether scanning is successful comprises:
   receiving, during the scanning, a signal including a first network identifier broadcasted on the first radio frequency of the plurality of radio frequencies;
   comparing a second network identifier configured at the user equipment with the first network identifier;
   determining that the scanning is successful when the first network identifier matches with the second network identifier; and
   determining that the scanning is not successful when the first network identifier does not match with the second network identifier or when no signal is received on the first radio frequency during the scanning.

8. The method of claim 7, wherein the first network identifier includes one or more of: a public land mobile network (PLMN) identifier; a closed subscriber group (CSG) identifier; and a citizen broadband radio service (CBRS) network identifier.

9. The method of claim 6, wherein when the scanning of the first radio frequency is not successful, the method further comprising:
   identifying a second radio frequency from the plurality of radio frequencies in the prioritized order, the second radio frequency having a higher scanning rank than other radio frequencies other than the first radio frequency in the prioritized order; scanning the second radio frequency of the plurality of radio frequencies; determining whether a scanning of the second radio frequency is successful; when the scanning of the second radio frequency is successful, selecting the second radio frequency as the target radio frequency; and when the scanning of the second radio frequency is not successful, repeating the steps of identifying, scanning, and determining for a next radio frequency having a higher scanning rank in than other radio frequencies other than first and second radio frequencies in the prioritized order until a scan of one of the plurality of radio frequencies is successful.

10. The method of claim 1, wherein the shared radio spectrum is allocated for primary usage by one or more incumbent devices and further corresponds to one of 3550 MHz to 3700 MHz radio spectrum or 3550 MHz to 4200 MHz radio spectrum that are dynamically allocated for Citizen Broadband Radio Service (CBRS).

11. The method of claim 1, wherein scanning comprises: initiating the scanning in response to detecting that the user equipment is powered on to operate in a citizen broadband radio service mode, or receiving an input to operate in the citizen broadband radio service mode.

12. A user equipment, comprising:
a memory for maintaining a radio frequency scan list that indicates a prioritized order with which a plurality of radio frequencies selected from a shared radio spectrum are to be scanned;
a wireless transceiver; and
an electronic processor communicatively coupled to the memory and wireless transceiver, the electronic processor configured to:
scan, via the wireless transceiver, the plurality of radio frequencies in accordance with the prioritized order that is indicated in the radio frequency scan list, select a target radio frequency from the plurality of radio frequencies based on the scan of the plurality of radio frequencies, the target radio frequency corresponding to a frequency band that is dynamically allocated from the shared radio spectrum to a radio access network associated with the user equipment, and
connect, via the wireless transceiver, to the radio access network using the frequency band corresponding to the target radio frequency;
wherein the prioritized order of the plurality of radio frequencies is determined as a function of a channel bandwidth associated with a communication service supported by the radio access network; and
a frequency reuse factor;
wherein the radio frequency scan list includes a plurality of frequency reuse channel sets, each channel set including a number of frequencies corresponding to the frequency reuse factor, and further wherein a number of frequency reuse channel sets in the radio frequency scan list is determined using a function:

S=integer part of (R/(B*N)),
where S is the number of frequency reuse channel sets, R is total size of the shared radio spectrum, B is the channel bandwidth associated with a communication service supported by the radio access network, and N is the frequency reuse factor.

13. The user equipment of claim 12, wherein the electronic processor is configured to:
determine that a connection to the radio access network is lost;
identify one of the plurality of frequency reuse channel sets that includes a most recent target radio frequency used by the user equipment to connect to the radio access network;
select a next radio frequency within the identified one of the frequency reuse channel sets, wherein the next radio frequency has a higher rank than other radio frequencies in the identified one of the frequency reuse channel sets other than the most recent target radio frequency; and
when scan of the next radio frequency is successful, connect, via the wireless transceiver, to the radio access network using a frequency band corresponding to the next radio frequency.

14. The user equipment of claim 12, wherein the electronic processor is configured to:
determine whether scan of a first radio frequency of the plurality of radio frequencies is successful; and
select the first radio frequency as the target radio frequency when the scan of the first radio frequency is successful.

15. The user equipment of claim 14, wherein the electronic processor is configured to:
receive, during the scan, a signal including a first network identifier broadcasted on the first radio frequency of the plurality of radio frequencies;
compare a second network identifier configured at the user equipment with the first network identifier;
determine that the scan is successful when the first network identifier matches with the second network identifier; and
determine that the scan is not successful when the first network identifier does not match with the second network identifier or when no signal is received on the first radio frequency during the scan.

16. The user equipment of claim 12, wherein the shared radio spectrum is allocated for primary usage by one or more incumbent devices and further corresponds to one of 3550 MHz to 3700 MHz radio spectrum or 3550 MHz to 4200 MHz radio spectrum that are dynamically allocated for Citizen Broadband Radio Service (CBRS).

* * * * *